United States Patent [19]

Schmoyer

[11] 4,125,590

[45] Nov. 14, 1978

[54] METHOD FOR MANUFACTURING BORON TRICHLORIDE

[75] Inventor: Laurence F. Schmoyer, Edmond, Okla.

[73] Assignee: Kerr-McGee Chemical Corporation, Oklahoma City, Okla.

[21] Appl. No.: 811,195

[22] Filed: Jun. 29, 1977

[51] Int. Cl.$^2$ ............................................. C01B 35/06
[52] U.S. Cl. .................................... 423/292; 423/499
[58] Field of Search ................ 423/292, DIG. 12, 499

[56] References Cited

U.S. PATENT DOCUMENTS

| 2,876,076 | 3/1959 | Montgomery et al. | 423/292 |
| 3,019,089 | 1/1962 | O'Hara | 423/292 |
| 3,095,271 | 6/1963 | McIntyre et al. | 423/292 |
| 4,024,221 | 5/1977 | Becker et al. | 423/292 |

FOREIGN PATENT DOCUMENTS 874,557  8/1961  United Kingdom.
887,400  1/1962  United Kingdom.

*Primary Examiner*—G. O. Peters
*Attorney, Agent, or Firm*—William G. Addison

[57] ABSTRACT

This invention relates to the manufacture of boron trichloride from a molten salt bath comprising a naturally occurring boric acid salt or other boron-containing ore, carbon and chlorine gas.

In accordance with the process of this invention, boron trichloride is produced in a single stage reaction by passing chlorine gas through as continuously fed molten boric acid salt rich layer in a reactor vessel which contains carbon. At least a portion of the gaseous products of the reaction are recovered and partially condensed to separate at least a crude boron trichloride liquid phase from the non-condensable gaseous products. The crude boron trichloride liquid phase then is subjected to a two-stage distillation from which is recovered a purified boron trichloride product.

4 Claims, 2 Drawing Figures

METHOD FOR MANUFACTURING BORON TRICHLORIDE

BACKGROUND OF THE INVENTION

1. Field of the Invention

This invention relates to the manufacture of boron trichloride from naturally occurring boric acid salts, such as sodium tetraborate.

2. Description of the Prior Art

Boron trichloride previously has been manufactured step-wise, converting boron salts to boron carbides. This process usually proceeds by first converting boron salts to boron oxides and then reacting the oxides with carbon to form a sintered boron carbide mass which thereafter is reacted with chlorine to form boron trichloride. Alternatively, boron trioxide or any other oxygen-containing boron compound has been reacted with carbon at high temperatures to form boron carbide followed by reaction with chlorine to form boron trichloride such as in U.S. Pat. Nos. 2,097,482, 3,019,089 and 3,152,869.

Boron trichloride also has been produced directly from naturally occurring borates (see U.S. Pat. No. 2,997,370) wherein boron-containing ore is admixed with carbon at temperatures above 500° C but below the melting point of the ore and chlorine gas is passed through a fixed bed of heated ore after which the volatile boron trichloride product is recovered. However, an alkaline chloride is produced as a by-product of this reaction which causes difficulties in the handling of such a fixed bed process, causing particle agglomeration and consequent reaction residue removal problems.

Thus, while boric oxide is a far lower cost source of boron than is boron carbide, it is a more expensive source than the naturally occurring boric acid salts such as sodium tetraborate and therefore, a process employing such naturally occurring boric acid salts would be desirous, particularly if the problems associated with fixed or fluidized bed operations can be overcome.

SUMMARY OF THE INVENTION

The surprising discovery has now been made that boron trichloride can be produced in high yield and with an elimination of various fixed and fluidized bed operational problems from a molten salt bath comprising a naturally occurring boric acid salt or other boron-containing ore, carbon and chlorine gas. It is a feature of the process of this invention that under certain temperature conditions, the molten alkaline chloride produced as a by-product of the reaction and the molten boric acid salt are not mutually soluble. Thus, the alkaline chloride produced as a by-product of the reaction can be separated continuously and removed from the reactor vessel while the existence of the second phase, rich in borate assures high reactant concentrations.

In accordance with the process of this invention, boron trichloride is produced in a single stage reaction by passing chlorine gas through a continuously fed molten boric acid salt rich layer in a reactor vessel which contains carbon. The reactor vessel is maintained at a temperature level within a range of from about 1525° F. to about 1575° F. to ensure the reactants remain in the molten state.

At least a portion of the gaseous products of the reaction, comprising primarily crude boron trichloride and carbon monoxide, pass from the reactor vessel to a condenser wherein the crude boron trichloride is liquefied. Thereafter, the still vaporous noncondensables comprising trace boron trichloride, carbon monoxide, carbon dioxide and hydrogen chloride are separated from the crude boron trichloride liquid phase in a phase separator vessel and subsequently disposed of by being sent to a gas scrubber unit to provide an ecologically acceptable gas for venting to the atmosphere.

The crude boron trichloride recovered in the phase separator flows to a two-stage distillation column for purification. The light ends produced in the first column, comprising primarily carbon dioxide and hydrogen chloride are removed overhead and sent to a gas scrubber unit before venting to the atmosphere while the partially purified boron trichloride bottoms are passed to the second distillation column. Pure boron trichloride is removed as the second column overhead and condensed for storage, while the second column bottoms comprising primarily trace silicon trichloride and other heavy metal chlorides are recovered.

The molten sodium chloride produced as a by-product in the reactor vessel is continuously removed by passage over a weir within the vessel as it separates from the molten boric acid salt-rich layer. The molten sodium chloride can be collected in a trough after passage over the weir where it is cooled and dissolved by a stream of water for transport to solar ponds or other recovery means.

DESCRIPTION OF THE PREFERRED EMBODIMENTS

Figure 1:
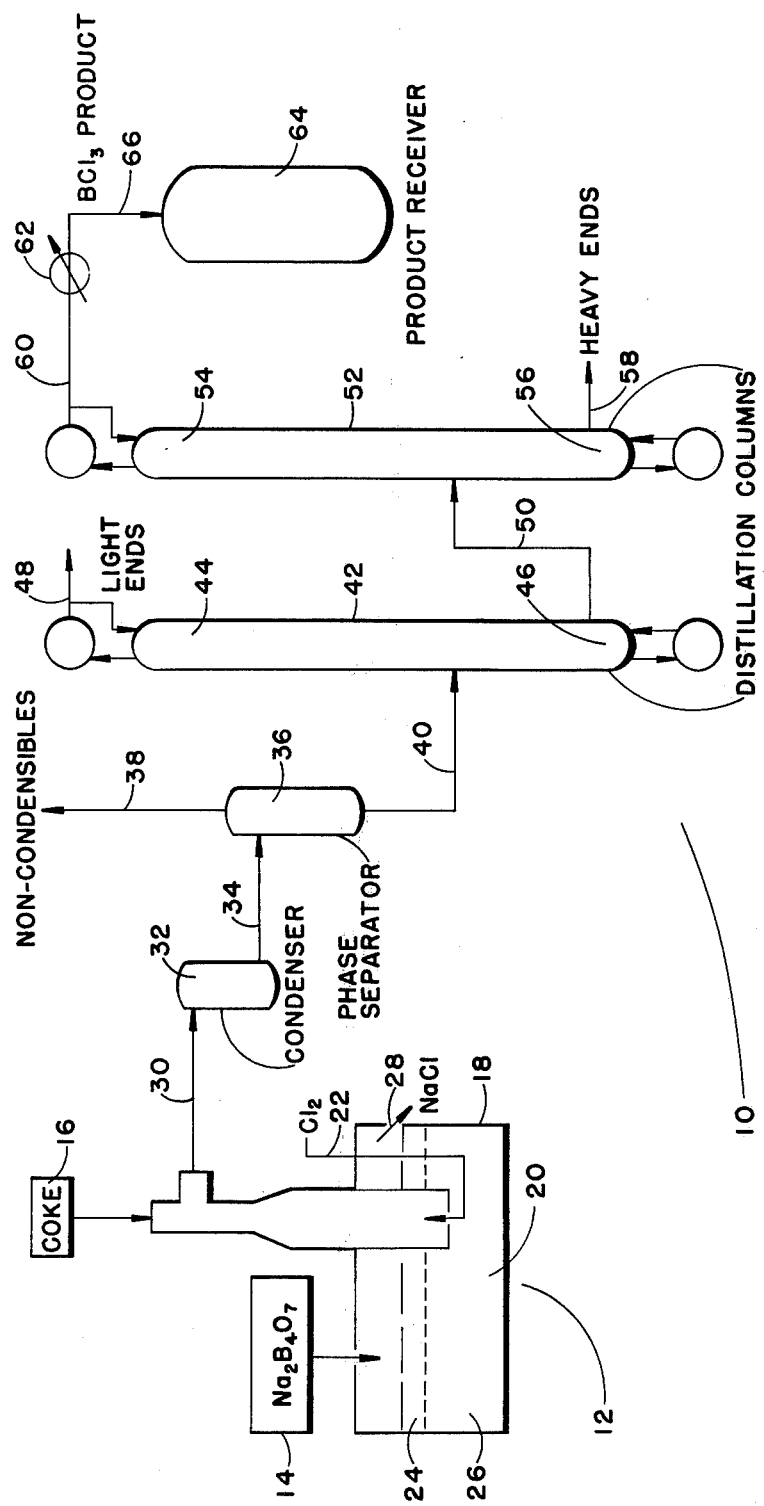
FIg. 1 is a diagrammatic, schematic, illustration of one form of apparatus suitable for the practice of applicant's invention.

Turning now to FIG. 1, a boron trichloride reaction system 10 is shown.

A continuous particulate feed of a naturally occurring boric acid salt such as sodium tetraborate enters a reaction zone 12 by a solids feed device 14 such as is conventionally known in the chemical industry, for example, a screw feeder. Carbon is also introduced into reaction zone 12 by a feed device 16 such as is also conventionally known. Suitable carbon sources comprise particulate coke, a mixture of carbon monoxide and chlorine, or phosgene.

The boric acid salt and carbon contained within reaction zone 12 thereafter is heated within a reaction vessel 18 to produce a molten reaction mixture 20 comprising the same. The molten reaction mixture is obtained by maintaining the temperature of reaction zone 12 within the range of from about 1525° F to about 1575° F.

Chlorine gas is introduced into the molten reaction mixture 20 via a line 22 to react with the mixture and produce the desired gaseous products. As a by-product of this reaction, sodium chloride is also formed and separates within the reaction mixture 20 to form an upper molten sodium chloride-rich layer 24 and a lower molten sodium tetraborate-rich layer 26. The molten sodium chloride-rich layer 24 is continuously removed from the reaction zone 12 by passage over a weir 28 contained within reaction vessel 18.

At least a portion of the gaseous products of the reaction, comprising primarily crude boron trichloride and carbon monoxide pass from the reactor vessel 18 via a line 30 to enter a partial condenser 32 wherein the crude boron trichloride is liquefied. Thereafter, the crude boron trichloride liquid and noncondensable gases flow from condenser 32 by a line 34 to enter a phase separator vessel 36.

In vessel 36, the crude liquid boron trichloride is separated from the still vaporous noncondensable gases comprising primarily trace boron trichloride, carbon monoxide, carbon dioxide and hydrogen chloride. The separated noncondensable gases then flow by a line 38 to a suitable waste gas disposal system (not shown) to provide an ecologically acceptable waste gas product before venting the same to the atmosphere.

The crude liquid boron trichloride separated in vessel 36 flows by a line 40 to enter a first distillation tower 42 for partial purification. In distillation tower 42 the crude boron trichloride separates into a light fraction comprising primarily carbon dioxide and hydrogen chloride in an upper portion 44 of tower 42 and a heavy fraction comprising partially purified boron trichloride in a lower portion 46 of tower 42.

The light fraction collected within the upper portion 44 of tower 42 is withdrawn via a line 48 and passed to a suitable waste gas disposal system (not shown).

The heavy fraction collected within the lower portion 46 of tower 42 flows by a line 50 to enter a second distillation tower 52.

In tower 52, the partially purified boron trichloride separates into a light fraction comprising primarily pure boron trichloride in an upper portion 54 of tower 52 and a heavy fraction comprising trace silicon trichloride and other heavy metal chlorides in a lower portion 56 of tower 52.

The heavy fraction collected within the lower portion 56 of tower 52 is withdrawn via a line 58 for subsequent recovery.

The light fraction comprising the purified boron trichloride collected within the upper portion 54 of tower 52 flows by a line 60 to a condenser 62 and on to a storage vessel 64 via a line 66.

Figure 2:
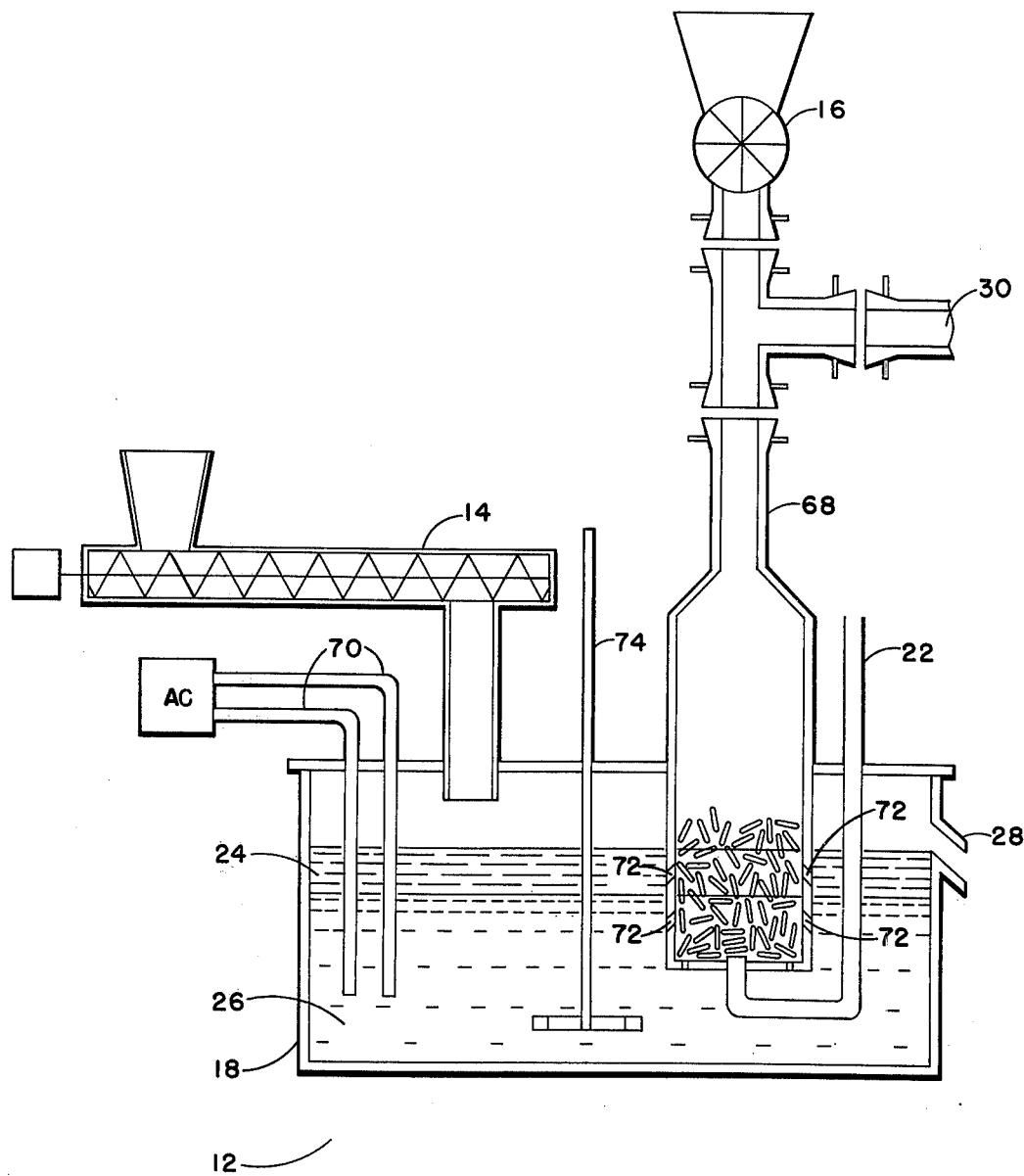
FIG. 2 is a detailed diagrammatic illustration of one form of the boron trichloride reactor zone suitable for the practice of applicant's invention.

Turning now to FIG. 2, a detailed diagrammatic illustration of one form of reactor zone 12 is shown.

Reactor zone 12 comprises reactor vessel 18 and a reaction compartment 68 wherein the boron trichloride is produced. The particulate feed of sodium tetraborate entering reaction zone 12 by solids feeder 14 is heated by an alternating current resistence heater 70 and stirred by an agitator 74 to provide a reserve of molten salts for the reaction compartment 68.

The molten salt enters reaction compartment 68 through a series of holes 72 which readily allow the passage of the molten salt in or out of the compartment but which are designed to restrict the flow of gaseous products therefrom.

Carbon is continuously charged to reaction compartment 68 by a feed device 16. In this particular illustration, the carbon is in the form of coke pellets or briquettes. The carbon is mixed with the molten salt to provide the molten reaction mixture 20 into which chlorine gas is introduced by line 22 to produce the desired gaseous products in accordance with the following basic reaction:

$$Na_2B_4O_7 + 7C + 7Cl_2 \rightarrow 4BCl_3 + 2NaCl + 7CO$$

The gaseous products produced within reaction compartment 68 are removed via line 30 for subsequent purification treatment as previously described.

When the concentration of the molten sodium chloride produced as a by-product of the reaction reaches about 30 percent by weight of the molten reaction mixture 20, the molten sodium chloride separates from the reaction mixture 20 to form an upper sodium chloride-rich layer 24 of which at least a portion is continuously removed by passage over weir 28 for subsequent recovery.

While the process and apparatus herein disclosed form one preferred embodiment of this invention, it is to be understood that this invention is not to be limited to these specific embodiments and that changes may be made in the process or apparatus of the present invention without departing from the spirit and scope of the invention except as defined in the following claims.

What is claimed is:

1. A process for producing boron trichloride which comprises:

introducing boron containing ore consisting essentially of sodium tetraborate into a reaction zone;

introducing carbon into said reaction zone;

heating said reaction zone to an elevated temperature to produce a molten reaction mixture consisting essentially of said boron-containing ore and carbon;

introducing chlorine gas into said molten reaction mixture to form molten by-products and gaseous products comprising crude boron trichloride within said reaction zone;

maintaining the reaction zone at an elevated temperature to effect a separation of the molten by-products from said molten reaction mixture to form a molten by-product-rich upper phase and a molten reactant-rich lower phase in said reaction zone;

withdrawing at least a portion of said molten by-product-rich upper phase; and recovering at least a portion of the gaseous products formed within said reaction zone.

2. The process of claim 1 wherein recovering at least a portion of the gaseous products is defined further to include the steps of:

partially condensing the gaseous products to produce at least a liquid phase comprising crude boron trichloride;

separating said liquid phase from said gaseous products;

subjecting said liquid phase to a two-stage distillation to produce at least a light phase comprising purified boron trichloride; and recovering said purified boron trichloride.

3. The process of claim 1 wherein maintaining the reaction zone at an elevated temperature is defined further as:

maintaining the reaction zone at a temperature level in the range of from about 1525° F. to about 1575° F. to effect the separation of the molten by-products from said molten reaction mixture.

4. The process of claim 1 wherein the molten by-product-rich phase consists essentially of sodium chloride.

* * * * *